United States Patent
Wakita

(10) Patent No.: US 10,240,971 B2
(45) Date of Patent: *Mar. 26, 2019

(54) VIBRATION VISUALIZER, VIBRATION MEASUREMENT SYSTEM, AND VIBRATION MEASUREMENT METHOD

(71) Applicant: Panasonic Intellectual Property Management Co., Ltd., Osaka (JP)

(72) Inventor: Naohide Wakita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 78 days.

This patent is subject to a terminal disclaimer.

(21) Appl. No.: 15/598,721

(22) Filed: May 18, 2017

(65) Prior Publication Data

US 2017/0356792 A1   Dec. 14, 2017

(30) Foreign Application Priority Data

Jun. 9, 2016   (JP) ................................. 2016-115608

(51) Int. Cl.
  *G01H 9/00*   (2006.01)
(52) U.S. Cl.
  CPC ..................... *G01H 9/00* (2013.01)
(58) Field of Classification Search
  CPC ...................................................... G01H 9/00
  (Continued)

(56) References Cited

U.S. PATENT DOCUMENTS 3,903,734 A * 9/1975 Douglas ................. G01N 3/068
                                                                73/579
4,818,101 A * 4/1989 Soreide ..................... G01P 5/26
                                                                250/201.4
(Continued)

FOREIGN PATENT DOCUMENTS

DE       19826565 A1 *  6/1999
JP       2005-283440      10/2005
(Continued)

OTHER PUBLICATIONS

Kohei Makino, et al., "Structural Identification of Existing Bridges by Vibration Measurements Using Laser Doppler Velocimeter", Journal of JSEM, vol. 11, No. 3, pp. 201-208, Sep. 2011. (with English Abstract).

*Primary Examiner* — Jacques M Saint Surin
(74) *Attorney, Agent, or Firm* — McDermott Will & Emery LLP

(57) ABSTRACT

A vibration visualizer comprising an optical member including a fixed section to be fixed to a measurement object; and a movable section movably supported by the fixed section such that a first positional relationship between the fixed section and the movable section is changed by application of an acceleration to the fixed section in a predetermined direction. The optical member changes a reflection intensity of light or electromagnetic wave reflected in a retroreflection direction according to a change of the first positional relationship. The first positional relationship in a stationary state where the acceleration is not applied to the fixed section and the first positional relationship is maintained constant, is different from the first positional relationship most suitable for retroreflection.

16 Claims, 15 Drawing Sheets

(58) Field of Classification Search
USPC .......................................................... 73/652
See application file for complete search history.

(56) References Cited

U.S. PATENT DOCUMENTS

| | | | | |
|---|---|---|---|---|
| 4,921,346 | A | * | 5/1990 | Tokumoto .............. G01Q 10/06 |
| | | | | 356/432 |
| 5,289,434 | A | | 2/1994 | Berni |
| 5,705,810 | A | | 1/1998 | Wang et al. |
| 2009/0152475 | A1 | * | 6/2009 | Sasaki ...................... G01J 3/10 |
| | | | | 250/492.1 |
| 2013/0329953 | A1 | * | 12/2013 | Schreier ............... G06T 7/2093 |
| | | | | 382/103 |
| 2013/0340595 | A1 | * | 12/2013 | Ho .......................... G10H 1/02 |
| | | | | 84/609 |
| 2018/0058841 | A1 | * | 3/2018 | Wakita ..................... G06T 7/74 |

FOREIGN PATENT DOCUMENTS

| | | |
|---|---|---|
| JP | 2015-001413 | 1/2015 |
| JP | 2015-102363 | 6/2015 |
| JP | 2015-166728 | 9/2015 |

\* cited by examiner

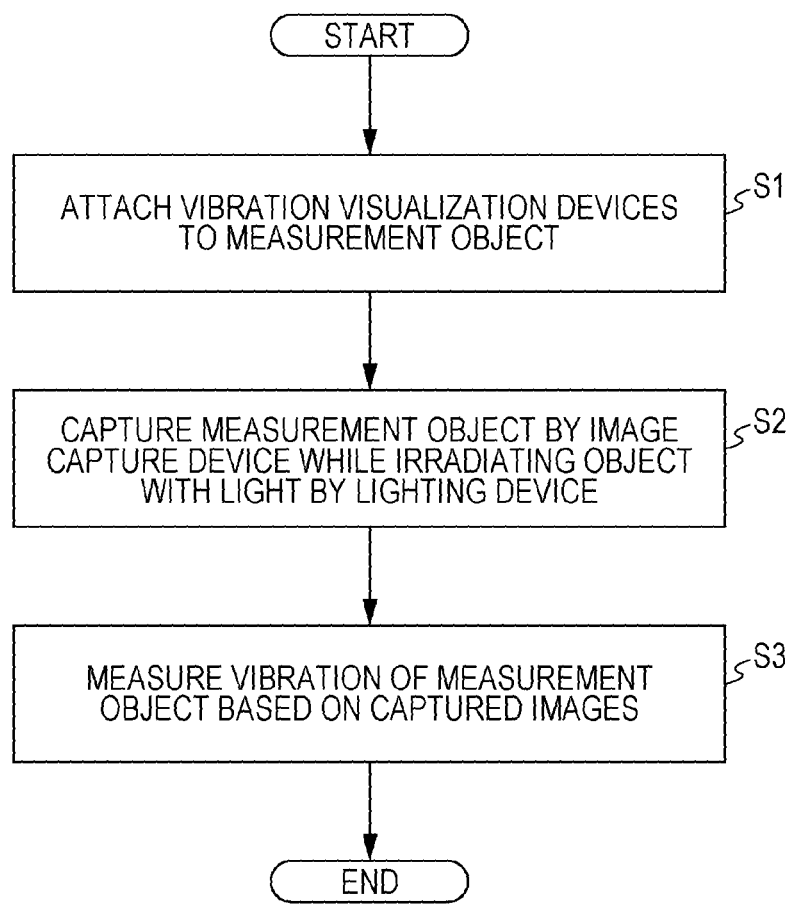

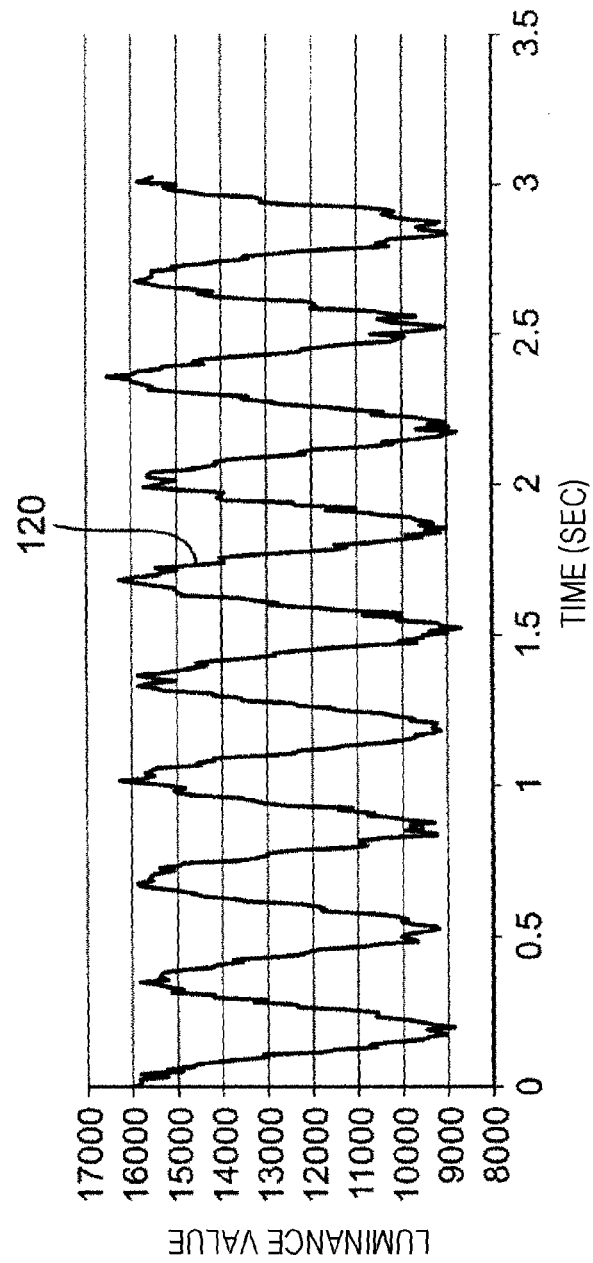

VIBRATION VISUALIZER, VIBRATION MEASUREMENT SYSTEM, AND VIBRATION MEASUREMENT METHOD

BACKGROUND

1. Technical Field

The present disclosure relates to a vibration visualizer to be attached to a measurement object, a vibration measurement system and a vibration measurement method using the vibration visualizer.

2. Description of the Related Art

In Japan, many of public structures such as a bridge or a tunnel were built in the high-growth period of the 1970s. In general, it is said that the lifespan of these structures is 50 years after construction. For this reason, it is expected that the number of structures with exceeded lifespan rapidly increases in the near future. Accordingly, demand for inspection and reinforcement of these structures is rapidly increasing.

In general, it is known that the stiffness and the natural frequency of a structure have a correlation. Inspection of deterioration of a structure by measuring a change in the natural frequency of a structure utilizing this relationship has been conducted conventionally.

For instance, Journal of JSEM (Journal of the Japanese Society for Experimental Mechanics), Vol. 11, No. 3, pp 201-208 (September, 2011), "Structural Identification of Existing Bridges Using Laser Doppler Velocimeter", Kouhei Makino, Hiroshi Matsuda, Chihiro Morita, Kazuo Ichimiya describes a method of inspecting a structure for deterioration, in which vibration of a bridge is measured using a laser Doppler velocimeter, and the rate of change in the natural frequency is checked before and after the bridge is reinforced.

In the University of Illinois in the U.S., a system has been researched and developed in which a great number of wireless sensor nodes each including an acceleration sensor, a CPU, and a wireless unit is attached to a measurement object, and vibration is analyzed based on data sent from the wireless sensor nodes (Illinois Structural Health Monitoring Project).

SUMMARY

One non-limiting and exemplary embodiment provides a vibration visualizer that visualizes vibration applied to a measurement object.

In one general aspect, the techniques disclosed here feature a vibration visualizer comprising an optical member including a fixed section to be fixed to a measurement object; and a movable section movably supported by the fixed section such that a first positional relationship between the fixed section and the movable section is changed by application of an acceleration to the fixed section in a predetermined direction. The optical member changes a reflection intensity of light or electromagnetic wave reflected in a retroreflection direction according to a change of the first positional relationship. The first positional relationship in a stationary state where the acceleration is not applied to the fixed section and the first positional relationship is maintained constant, is different from the first positional relationship most suitable for retroreflection.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 9 is a flowchart of a vibration measurement method using the vibration measurement system of FIG. 1;

FIG. 15 is a graph illustrating a change in luminance value when predetermined vibration is applied to a vibration visualizer according to an embodiment.

DETAILED DESCRIPTION (Underlying Knowledge Forming Basis of the Present Disclosure)

The present disclosure relates to a vibration visualizer that can visualize fine vibration of a measurement object, such as a bridge or a tunnel, and a vibration measurement system and a vibration measurement method using the vibration visualizer.

A laser Doppler velocimeter is a device that utilizes the Doppler effect, irradiates a measurement object with a laser from a measuring instrument and measures a velocity of the laser moving away from the measuring instrument, and a velocity of the laser moving closer to the measuring instrument after being reflected by the measurement object. Thus, with a vibration measurement method using a laser Doppler velocimeter, vibration can be measured at only one spot at a time, and it takes a considerable time to measure the vibration of the entire measurement object.

In contrast, with a vibration measurement method using wireless sensor nodes, the wireless sensor nodes are attached to the entire measurement object in a distributed state, thereby making it possible to simultaneously measure the vibration of the entire measurement object. However, with this vibration measurement method, the power consumption of a sensor, a CPU, a wireless unit and others is high, and thus it is necessary to replace batteries frequently. Particularly when a measurement object is a large-size structure such as a bridge, it is extremely difficult to frequently replace the batteries of the wireless sensor nodes attached to the large-size structure. For this reason, it is called for to reduce the number of times of maintenance as much as possible.

Thus, the present inventor has intensively studied in order to provide a vibration visualizer, a vibration measurement system and a vibration measurement method using the vibration visualizer that are capable of measuring vibration of the entire measurement object in a shorter time and of reducing the number of times of maintenance. As a result, the present inventor has devised a vibration visualizer, a vibration measurement system and a vibration measurement method using the vibration visualizer that are capable of measuring vibration of the entire measurement object in a shorter time and of reducing the number of times of maintenance.

Hereinafter, an embodiment of the present disclosure will be described with reference to the drawings. It is to be noted that the present disclosure is not limited by the embodiment. The same or similar components are labeled with the same symbol, and a description thereof may be omitted.

First Embodiment

Figure 1:
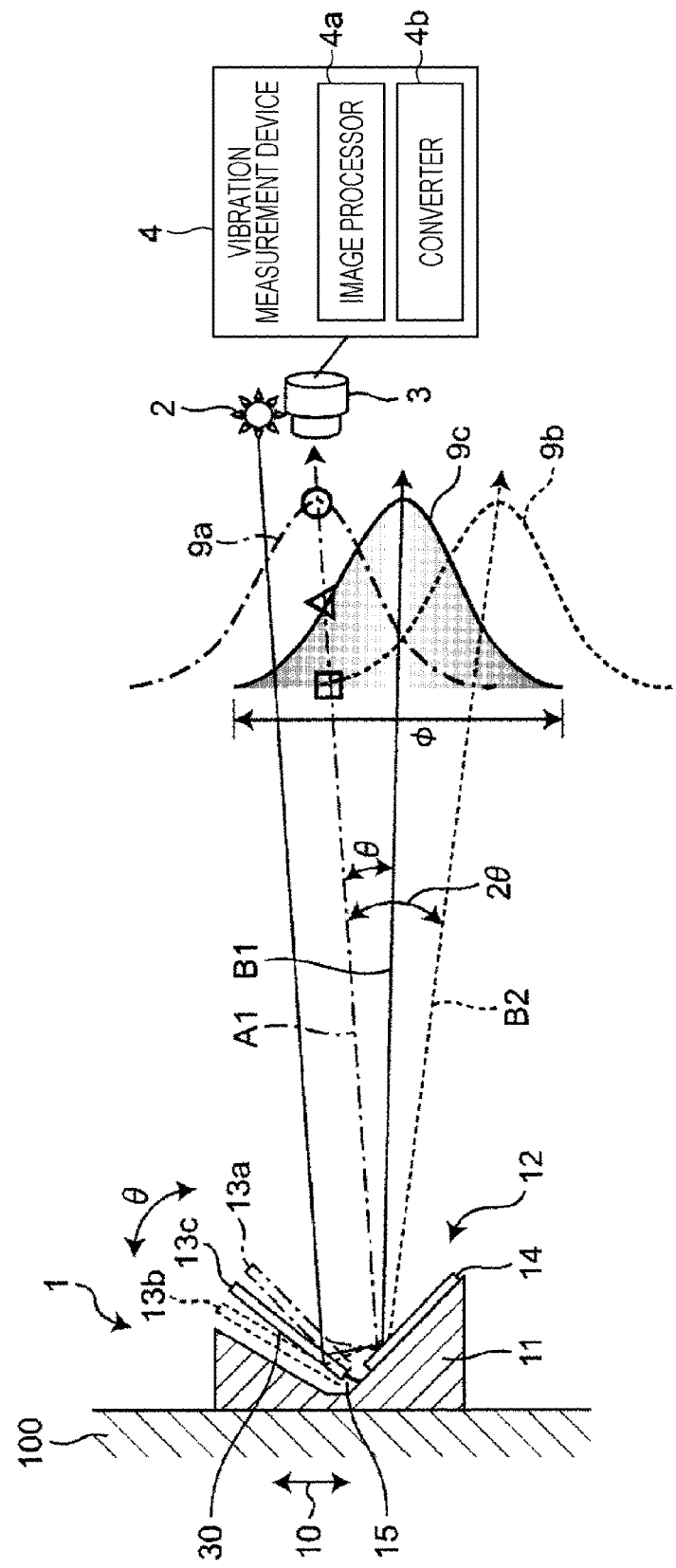
FIG. 1 is a schematic configuration diagram of a vibration measurement system according to a first embodiment of the present disclosure.

FIG. 1 is a schematic configuration diagram of a vibration measurement system according to a first embodiment of the present disclosure. The vibration measurement system according to the first embodiment includes a vibration visualizer 1, a lighting device 2, an image capture device 3, and a vibration measurement device 4.

The vibration visualizer 1 is attached to a measurement object 100, such as a bridge or a tunnel to visualize vibration (mechanical vibration) applied to the measurement object 100. As illustrated in FIG. 1, the vibration visualizer 1 includes a case 11, and an optical member 12 having a retroreflective property for light or electromagnetic wave.

Figure 2:
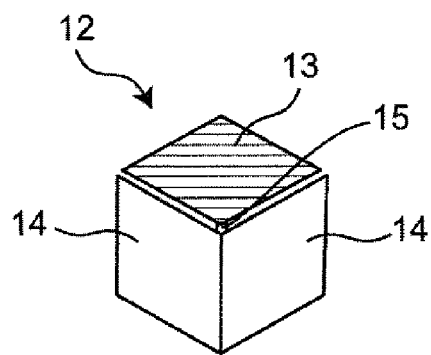
FIG. 2 is a perspective view of an optical member provided in the vibration measurement system of FIG. 1.

As illustrated in FIG. 2, the optical member 12 includes three mirrors that are arranged to intersect with each other. In the first embodiment, one of the three mirrors is a movable mirror 13 that is moved according to vibration applied to the measurement object 100. Two out of the three mirrors are fixed mirrors 14. At least one of the two fixed mirrors 14 is fixed to the case 11. The movable mirror 13 is an example of part of the optical member 12. The fixed mirrors 14 are an example of the other part of the optical member 12. The movable mirror 13 is configured to be movable relative to the fixed mirror 14 according to vibration. The case 11 is composed of, for instance, resin, metal, or a combination of these.

The movable mirror 13 is coupled to the case 11 via a spring 15 which is an example of the elastic member. As illustrated in FIG. 1, the movable mirror 13 is configured to receive an inertial force caused by vibration 10 applied to the measurement object 100 and to be oscillated by the elastic force of the spring 15 between a position 13a illustrated by a dashed-dotted line and a position 13b illustrated by a dotted line. When the vibration 10 applied to the measurement object 100 is zero, the movable mirror 13 is located at a position 13c illustrated by a solid line. The position 13c is also referred to as the initial position.

The lighting device 2 is a device that irradiates the vibration visualizer 1 with light or electromagnetic wave. As the lighting device 2, a light source that is unlikely to cause flicker, for instance, a device such as a DC (direct current) driven LED may be used. It is to be noted that the lighting device 2 may not be a particular lighting device as long as the lighting device 2 provides a brightness according to an appropriate irradiation angle, and an image capture distance and environment for irradiating the measurement object 100. As the lighting device 2, for instance, an LED lighting, an HID lighting, a halogen lighting, a mercury lamp may be used. The lighting device 2 may include, for instance, a light source such as a white LED and an emission optical system, and may be configured to emit light through an emission port of the emission optical system.

As illustrated in FIG. 1, the image capture device 3 is a device that captures an image including reflection light or reflection electromagnetic wave reflected in a retroreflection direction by the optical member 12. In the first embodiment, the image capture device 3 is disposed in the vicinity of the lighting device 2. As the image capture device 3, for instance, a camera or a radar may be used. Also, the image capture device 3 may be a digital video camera equipped with, for instance, a CMOS or a CCD and an incident lens. In this case, the distance between the center of the incident lens of the image capture device 3 and the center of the light emission port of the lighting device 2 may be within 1 m, and may be within 50 cm. Also, the image capture device 3 and the lighting device 2 may be connected and fixed to each other so that the mutual positional relationship is not changed during image capture. Thus, even when the image capture device 3 is mounted on a mobile object or is swung due to disturbance such as wind, stable image-capture and measurement is possible because of the retroreflective property of the vibration visualizer 1.

It is sufficient that the image capture device 3 be capable of capturing dynamic images at a sufficient speed to capture a change in the amount of emission intensity of reflection light or reflection electromagnetic wave. It is to be noted that when the measurement object 100 is a large size structure like a bridge, the natural frequency of the structure is low such as several tens Hz or less. For this reason, even when a commonly available digital camera is used as the image capture device 3, it is possible to capture dynamic images at a sufficient speed.

The vibration measurement device 4 is a device that measures vibration applied to the measurement object 100, based on the image captured by the image capture device 3. In the first embodiment, the vibration measurement device 4 detects a change in the luminance of the vibration visualizer 1 from the captured image, and converts the detected change in the luminance to a signal corresponding to the magnitude of relevant vibration, thereby measuring the vibration applied to the measurement object 100. Specifically, the vibration measurement device 4 includes an image processor 4a that detects a change in the luminance of the vibration visualizer 1 from the captured image, and a converter 4b that converts the detected change in the luminance to a signal corresponding to the magnitude of relevant vibration. The vibration measurement device 4 can be implemented by a software installed, for instance, in a personal computer. Also, the vibration measurement device 4 may include, for instance, a memory that stores software and image data, a processor and a display.

Figure 3:
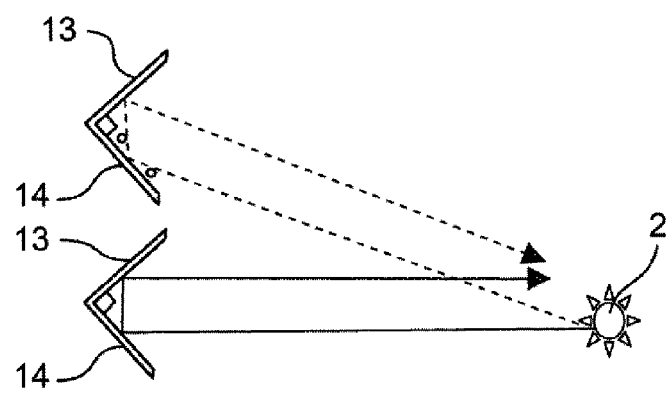
FIG. 3 is a side view illustrating the principle of reflection of light or electromagnetic wave by the optical member of FIG. 2.
Figure 4:
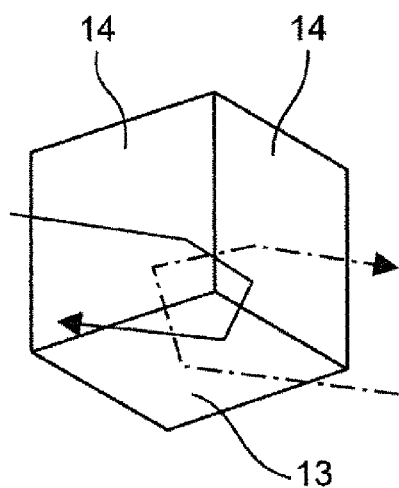
FIG. 4 is a perspective view illustrating the principle of reflection of light or electromagnetic wave by the optical member of FIG. 2.

When the movable mirror 13 is in a perpendicular position with respect to the two fixed mirrors 14, light or electromagnetic wave incident on the movable mirror 13 or the fixed mirrors 14 is reflected twice as illustrated by the solid line arrow or the dotted line arrow in the side view of FIG. 3. The total of the sum of the reflection angles in the two times reflections and the angle (90 degrees) formed by the movable mirror 13 and the fixed mirrors 14 is 180 degrees. Therefore, the reflection light or the reflection electromagnetic wave reflected by the movable mirror 13 or the fixed mirrors 14 transmit in the opposite direction to the incident direction. Hereinafter, the transmission direction of the light or the electromagnetic wave transmitting in the opposite direction to the incident direction is referred to as the "retroreflection direction". It is to be noted that when the movable mirror 13 and the two fixed mirrors 14 are illustrated three-dimensionally as in the perspective view of FIG. 4, light or electromagnetic wave emitted from the lighting device 2 enters the inner surfaces of the three mirrors, then is reflected three times and is transmitted in the retroreflection direction.

In FIG. 1, the position 13a illustrated by a dashed-dotted line depicts a state where the movable mirror 13 is in a perpendicular position with respect to the fixed mirrors 14. At this point, as illustrated by the dashed-dotted line arrow, light or electromagnetic wave emitted from the lighting device 2 is reflected by the movable mirror 13 positioned at the position 13a and a fixed mirror 14, and is transmitted in a retroreflection direction A1.

In FIG. 1, the position 13c illustrated by a solid line depicts a state where the movable mirror 13 is positioned at a position displaced by angle θ/2 from the position 13a in a perpendicular position with respect to a fixed mirror 14. In other words, the position 13c illustrated by the solid line depicts a state where the movable mirror 13 is positioned at a position displaced by the (90 degrees+θ/2) from the fixed mirror 14. At this point, as illustrated by the solid line arrow, light or electromagnetic wave emitted from the lighting device 2 is reflected by the movable mirror 13 positioned at the position 13c and the fixed mirror 14, and is transmitted in a reflection direction B1. The reflection direction B1 is deviated from the retroreflection direction A1 by the angle θ.

In FIG. 1, the position 13b illustrated by a dotted line depicts a state where the movable mirror 13 is positioned at a position displaced by the angle θ from the position 13a in a perpendicular position with respect to a fixed mirror 14. In other words, the position 13b illustrated by the dotted line depicts a state where the movable mirror 13 is positioned at a position displaced by the (90 degrees+θ) from the fixed mirror 14. At this point, as illustrated by the dotted line arrow, light or electromagnetic wave emitted from the lighting device 2 is reflected by the movable mirror 13 positioned at the position 13c and the fixed mirror 14, and is transmitted in a reflection direction B2. The reflection direction B2 is deviated from the retroreflection direction A1 by the angle 2θ.

Figure 5:
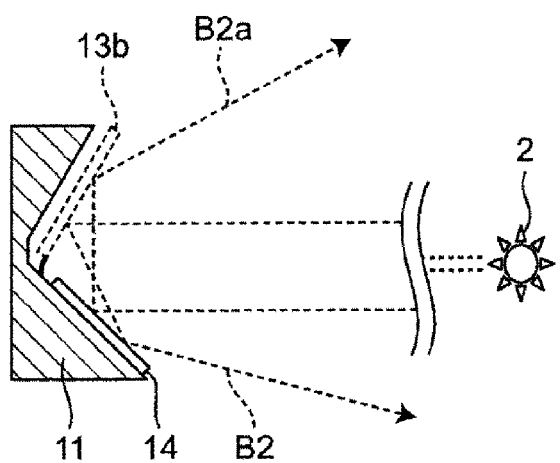
FIG. 5 is a side view illustrating propagation directions of reflection light or reflection electromagnetic wave reflected by the optical member of FIG. 2.

Although light or electromagnetic wave emitted from the lighting device 2 is illustrated as a line in order to simplify the explanation in FIG. 1, practically, light or electromagnetic wave emitted from the lighting device 2 is emitted to the entire optical member 12. For this reason, as illustrated in the side view of FIG. 5, when the movable mirror 13 is positioned at the position 13b, some light or electromagnetic wave is reflected by the movable mirror 13, and a fixed mirror 14 in this order, and is transmitted in the reflection direction B2, and other light or electromagnetic wave is reflected by a fixed mirror 14, and the movable mirror 13 in this order, and is transmitted in a reflection direction B2a. The reflection direction B2 is deviated from the retroreflection direction A1 by the angle 2θ, and the reflection direction B2a is deviated from the retroreflection direction A1 by the angle −2θ.

Although the reflection directions A1, B1, B2 of reflection light or reflection electromagnetic wave are illustrated as a line in FIG. 1, practically, the movable mirror 13 and the fixed mirrors 14 have fine asperities, an arrangement error, and a variation in angle. Therefore, the reflection light or reflective electromagnetic wave have diffuseness. The diffuseness varies with the level of asperities of the mirrors, an error in arrangement, and a variation in the angle between mirrors. The diffuseness, however, essentially exhibits an emission intensity distribution such as a normal distribution.

Specifically, reflection light or reflection electromagnetic wave reflected in the retroreflection direction A1 has diffuseness such that the emission intensity has a peak at the retroreflection direction A1 and the emission intensity attenuates as the reflection direction is deviated from the retroreflection direction A1. The light intensity distribution of the reflection light reflected in the retroreflection direction A1 is conceptually illustrated by a curve 9a, where the horizontal direction of FIG. 1 indicates the magnitude of emission intensity and the vertical direction of FIG. 1 indicates the azimuth. Similarly, the reflection light or reflection electromagnetic wave reflected in the reflection directions B1, B2 has diffuseness such that the emission intensity has respective peaks at the reflection directions B1, B2 and the emission intensity attenuates as the reflection direction is deviated from the reflection directions B1, B2. The light intensity distributions of the reflection light reflected in the reflection directions B1, B2 are conceptually illustrated by curves 9c, 9b, respectively.

When the movable mirror 13 is positioned at the initial position 13c, as illustrated by the curve 9c, the light intensity distribution of reflection light is in an angle range with a diffusion angle φ having a peak at the reflection direction B1. In this state, when the movable mirror 13 is vibrated from the initial position 13c to the position 13a or the position 13b, the light intensity distribution of reflection light varies as indicated by the curve 9a or the curve 9b.

The emission intensity of the reflection light that enters the image capture device 3 is the intensity at the intersection points of the curves 9a, 9b and 9c and the retroreflection direction A1. In other words, when the movable mirror 13 is positioned at the position 13a, the intersection point (indicated by a circle symbol) of the curve 9a and the retroreflection direction A1 indicates the emission intensity of the reflection light that enters the image capture device 3. Also, when the movable mirror 13 is positioned at the position 13c, the intersection point (indicated by a triangle symbol) of the curve 9c and the retroreflection direction A1 indicates the emission intensity of the reflection light that enters the image capture device 3. Also, when the movable mirror 13 is positioned at the position 13b, the intersection point (indicated by a square symbol) of the curve 9b and the retroreflection direction A1 indicates the emission intensity of the reflection light that enters the image capture device 3. Therefore, when the movable mirror 13 is positioned at the position 13a perpendicular to the fixed mirrors 14, the emission intensity of the reflection light that enters the image capture device 3 has a maximum. On the other hand, when the movable mirror 13 is positioned at the position 13b displaced from the position 13a by the angle θ, the emission intensity of the reflection light that enters the image capture device 3 is substantially zero.

In addition, as illustrated by the curves 9a, 9b and 9c, the light intensity distribution of the reflection light becomes zero at each angle (φ/2) that is half of the diffusion angle φ away from the peak. For this reason, the deviation angle 2θ of the reflection direction B2 with respect to the retroreflection direction A1 may be set to φ/2. In this case, the luminance detected by the image capture device 3 becomes darker as the movable mirror 13 moves from position 13a to the position 13b. Thus, the range of change in the luminance can be further increased.

Figure 6:
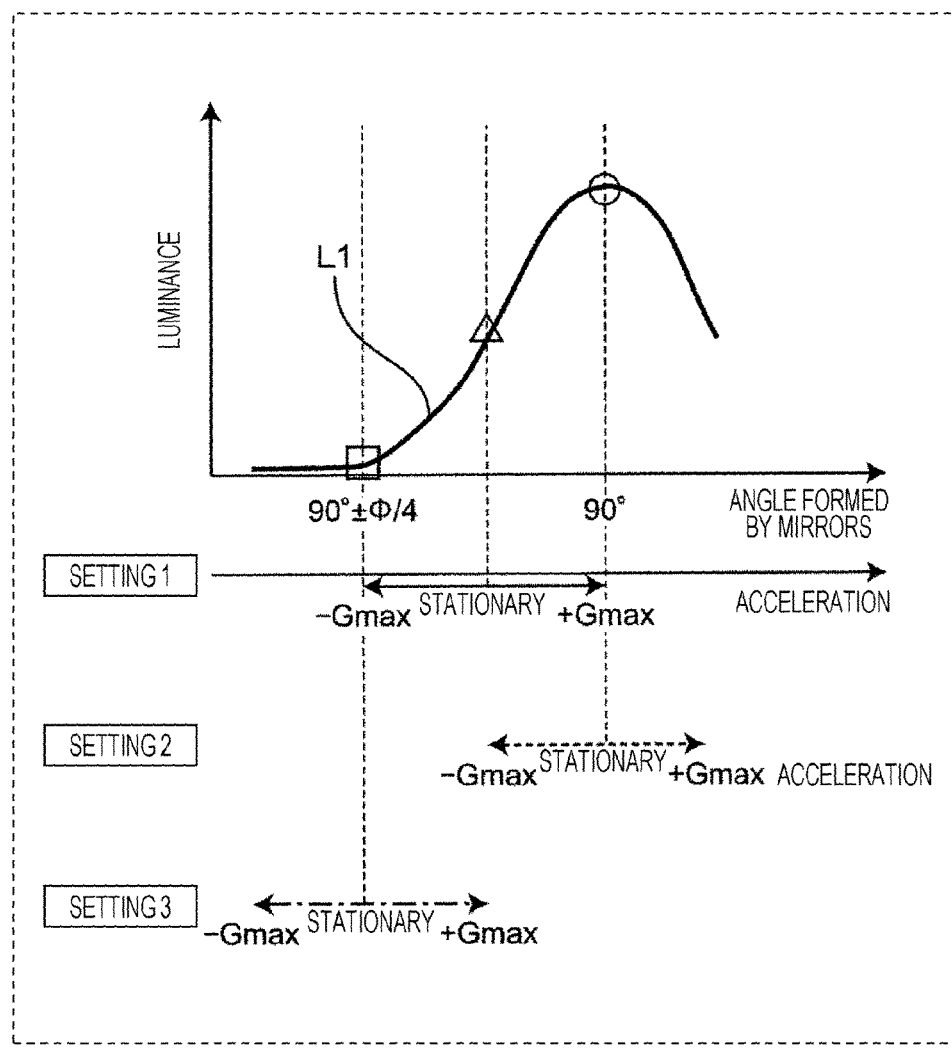
FIG. 6 is a graph illustrating a relationship among an angle formed by mirrors, an acceleration of a measurement object, and a luminance detected by an image capture device.

FIG. 6 is a graph illustrating a relationship between the angle formed by the movable mirror 13 and the fixed mirrors 14, and the luminance detected by the image capture device 3. The graph also illustrates a relationship between the acceleration of the measurement object 100 and the luminance. The acceleration herein is caused by the vibration 10 of the measurement object 100 and does not include the gravitational acceleration. However, the position of each mirror in a stationary state (when the vibration 10 is zero) is under influence of the gravity. In other words, the vibration visualizer 1 is designed or adjusted so that the movable mirror 13 is positioned at a predetermined position in a state where the device 1 is attached to the measurement object 100 and is subject to the gravity. The luminance detected by the image capture device 3 changes according to the acceleration so as to follow a characteristic curve L1 as illustrated in FIG. 6.

In the setting 1 of FIG. 6, the angle formed by the mirrors is set to be 90 degrees when the acceleration is maximum +Gmax, and the angle formed by the mirrors is set to be (90±φ/4) degrees (=(90±θ) degrees) when the acceleration is minimum −Gmax. The vibration measurement system according to the first embodiment illustrated in FIG. 1 is configured according to the setting 1. It is to be noted that +Gmax is a maximum value of the acceleration in a predetermined direction, and −Gmax is a maximum value of the acceleration in the opposite direction to the predetermined direction.

In the setting 1, when the acceleration is zero, the luminance detected by the image capture device 3 is an intermediate value between a maximum value and a minimum value of the luminance. Here, the acceleration is zero indicates that the vibration 10 is zero. Also, the luminance detected by the image capture device 3 is correlated with the emission intensity of reflection light or reflection electromagnetic wave. In other words, in the setting 1, the emission intensity when the vibration is zero is an intermediate value between a maximum value and a minimum value of the emission intensity.

Also, in the setting 1, when the acceleration changes from −Gmax to +Gmax, the luminance detected by the image capture device 3 monotonously increases in an S-shape. On the other hand, when the acceleration changes from +Gmax to −Gmax, the luminance detected by the image capture device 3 decreases monotonously in the S-shape. When a change in the luminance is detected from an image captured by the image capture device 3 and γ correction is performed on a characteristic curve indicating the detected change in the luminance, the vibration and the luminance can have a directly proportional relationship. This allows the detected change in the luminance to be converted to vibration, and it is possible to measure vibration of the measurement object 100 from the luminance detected by the image capture device 3.

Figure 7A:
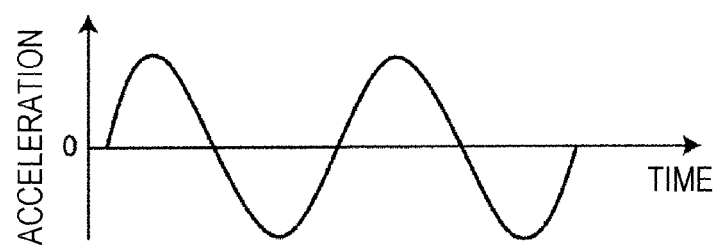
FIG. 7A is a graph of vibration indicating an acceleration change in a sine waveform.
Figure 7B:
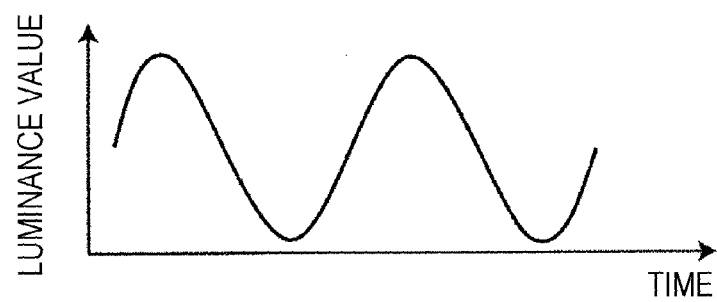
FIG. 7B is a graph illustrating a change in luminance when the vibration indicated by acceleration change in a sine waveform in the range of acceleration change in setting 1 of FIG. 6 is applied to the vibration visualizer of FIG. 1.
Figure 7C:
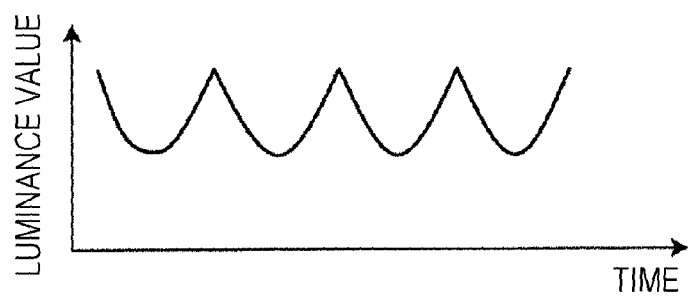
FIG. 7C is a graph illustrating a change in luminance when the vibration indicated by acceleration change in a sine waveform in the range of acceleration change in setting 2 of FIG. 6 is applied to the vibration visualizer of FIG. 1.

It is to be noted that in the setting 1, when vibration exhibiting an acceleration change in the sine waveform as illustrated in FIG. 7A is applied to the vibration visualizer 1, a luminance value change similar to the acceleration change can be obtained as illustrated in FIG. 7B.

In the setting 2 of FIG. 6, the angle formed by the mirrors is set to be 90 degrees when the acceleration is zero. In the setting 2, the increase and decrease relationships of luminance are reversed at the timing when the acceleration becomes zero. Therefore, the luminance detected by the image capture device 3 does not monotonously increase or decrease as in the setting 1, and it is not possible to easily calculate the acceleration based on the luminance.

It is to be noted that in the setting 2, when vibration exhibiting an acceleration change in the sine waveform as illustrated in FIG. 7A is applied to the vibration visualizer 1, the luminance has a maximum when the acceleration is zero and the luminance value changes in a waveform with a period twice as long as the period of the waveform of the acceleration.

In the setting 3 of FIG. 6, the angle formed by the mirrors is set to be (90+φ/4) degrees (=(90+θ) degrees) or (90−φ/4) degrees (=(90−θ) degrees) when the acceleration is zero. In the setting 3, when the angle formed by the mirrors increases more than (90+φ/4) degrees or decreases less than (90−φ/4) degrees, the luminance is substantially zero, and thus acceleration change is not detectable.

Figure 7D:
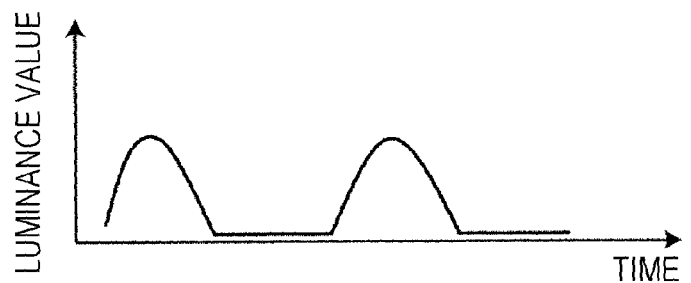
FIG. 7D is a graph illustrating a change in luminance when the vibration indicated by acceleration change in a sine waveform in the range of acceleration change in setting 3 of FIG. 6 is applied to the vibration visualizer of FIG. 1.

It is to be noted that in the setting 3, when vibration exhibiting an acceleration change in the sine waveform as illustrated in FIG. 7A is applied to the vibration visualizer 1, the luminance value is substantially zero (noise only) in a range where the acceleration is less than zero, as illustrated in FIG. 7D. Thus, it is not possible to reproduce the correct waveform.

In this manner, the vibration can be easily measured from the luminance (the emission intensity of reflection light or reflection electromagnetic wave) detected by the image capture device 3 by appropriately setting an operational range of the angle formed by the mirrors. In setting of a range of change in the angle formed by the mirrors, the position of the movable mirror 13 for zero vibration may be set so that the luminance of the retroreflection direction A1 is a value (for instance, the median value) between a maximum value and a minimum value. At this point, the angle formed by the mirrors is set to the middle angle between 90 degrees and (90+φ/4) degrees or the middle angle between 90 degrees and (90−φ/4) degrees. Moreover, an appropriate measurement range may be limited between the acceleration according to the maximum luminance value and the acceleration according to the minimum luminance value. Thus, the acceleration and the luminance exhibit increase and decrease, which enables accurate vibration measurement.

It is to be noted that in general, (mechanical) vibration is expressed by the change per second of the index of one of the displacement, velocity and acceleration of a measurement object. Also in the present disclosure, a measurable vibration is determined by the relationship between the natural frequency of the movable mirror 13 and the vibrational frequency band of the measurement object 100, and an index to be used is selectable by the design for the natural frequency of the movable mirror 13. Specifically, for a frequency sufficiently lower than the natural frequency of the movable mirror 13, the movable mirror 13 moves directly proportional to the acceleration. For a frequency sufficiently higher than the natural frequency of the movable mirror 13, the movable mirror 13 moves directly proportional to the displacement. When a damper is operated with a frequency near the natural frequency of the movable mirror 13, the movable mirror 13 moves directly proportional to the velocity. Any of a displacement meter, a velocimeter and an accelerometer may be used because the displacement, velocity, and acceleration are mutually convertible by differentiation or integration. Also, when the angle formed by the mirrors is similarly set, the same operational effects are obtained by detecting vibration using the displacement or the velocity.

According to the first embodiment, since the optical member 12 has a retroreflective property, when multiple optical members 12 are irradiated with light or electromagnetic wave by one lighting device 2, reflection light or reflection electromagnetic wave reflected by the optical members 12 can be received by one image capture device 3. Specifically, multiple vibration visualizers 1 are attached to the measurement object 100, and the multiple vibration visualizers 1 are irradiated with light or electromagnetic wave by the lighting device 2. This enables a single image capture device 3 to concurrently measure changes in the emission intensity of the reflection light or reflection electromagnetic wave reflected by the multiple vibration visualizers. This enables quicker detailed analysis of a state of vibration of the entire measurement object 100, and thus the vibration 10 applied to the measurement object 100 can be visualized.

Also, according to the first embodiment, the vibration visualizer 1 does not include a component that consumes power, and thus there is no necessity of replacing a battery and the number of times of maintenance can be reduced. In addition, the manufacturing cost of the vibration visualizer 1 can be reduced and deterioration such as corrosion can be lessened.

Also, according to the first embodiment, movement of the movable mirror 13 relative to the fixed mirrors 14 according to the vibration 10 allows the emission intensity of the reflection light or reflection electromagnetic wave in the retroreflection direction from the optical member 12 to be changed. In addition, the emission intensity when the vibration 10 is zero is a value between a maximum value and a minimum value of the emission intensity. Specifically, for instance, when the vibration 10 is zero, the angle formed by the movable mirror 13 and the fixed mirrors 14 is greater than 90 degrees. With this configuration, the emission intensity of the reflection light or reflection electromagnetic wave can be increased or decreased in a wider range according to the vibration 10, and thus it is possible to measure the vibration 10 more easily.

According to the first embodiment, the optical member 12 is configured (that is, the setting 1) to increase or decrease the emission intensity of the reflection light or reflection electromagnetic wave according to an increase or decrease of the vibration 10 in a preset measurable range. Specifically, the optical member 12 is configured such that the minimum value of the angle formed by the movable mirror 13 changed by the vibration 10 and the fixed mirrors 14 is 90 degrees or greater. With this configuration, the emission intensity of the reflection light or reflection electromagnetic wave can be increased or decreased in a still wider range according to the vibration 10, and thus it is possible to measure the vibration 10 still more easily.

It is to be noted that although the first embodiment adopts a configuration in which when the vibration 10 is zero, the angle formed by the movable mirror 13 and the fixed mirrors 14 is greater than 90 degrees, the present disclosure is not limited to this. For instance, when the vibration 10 is zero, the angle formed by the movable mirror 13 and the fixed mirrors 14 may be smaller than 90 degrees. With this configuration, the same effects are also obtainable.

Although the first embodiment adopts a configuration in which the minimum value of the angle formed by the movable mirror 13 changed by the vibration 10 and the fixed mirrors 14 is 90 degrees or greater, the present disclosure is not limited to this. For instance, the maximum value of the angle formed by the movable mirror 13 changed by the vibration 10 and the fixed mirrors 14 may be 90 degrees or less. With this configuration, the same effects are also obtainable.

Figure 8A:
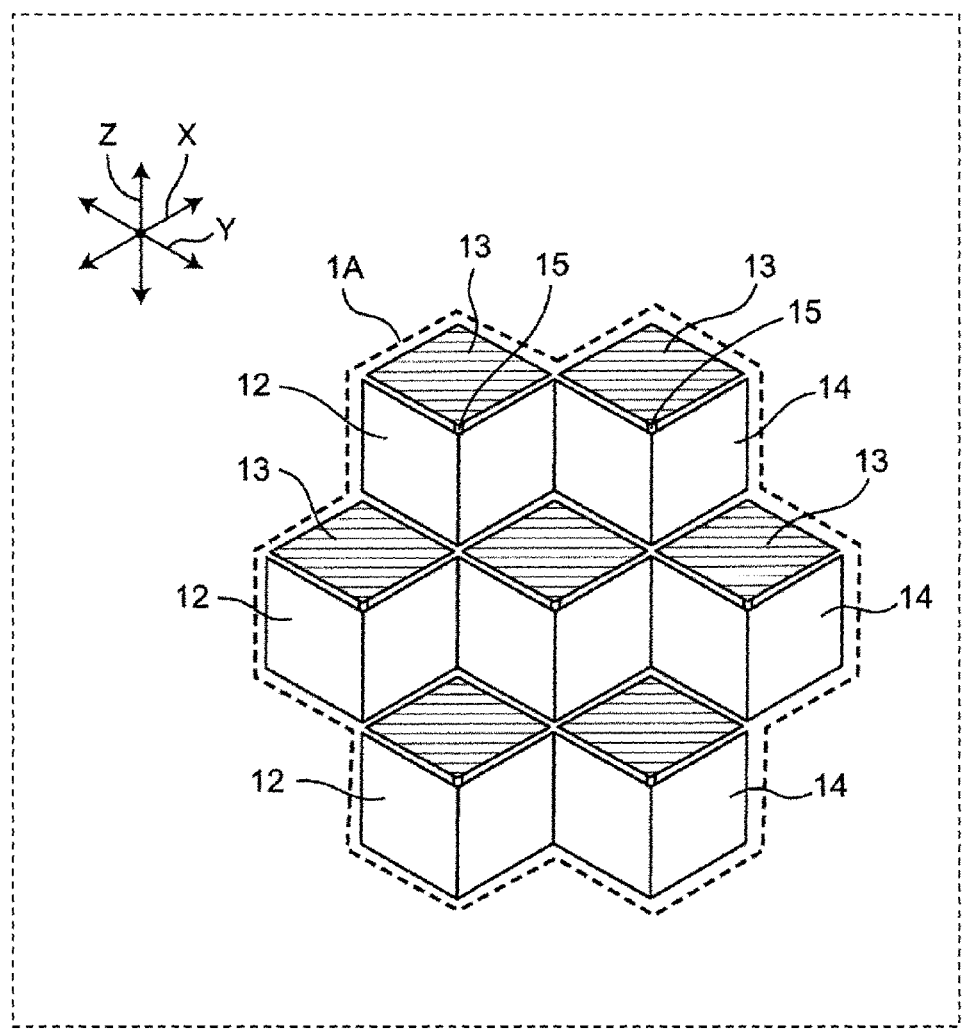
FIG. 8A is an illustration depicting an example of a vibration visualizer that includes multiple pieces of the optical member of FIG. 2 arranged densely.
Figure 8B:
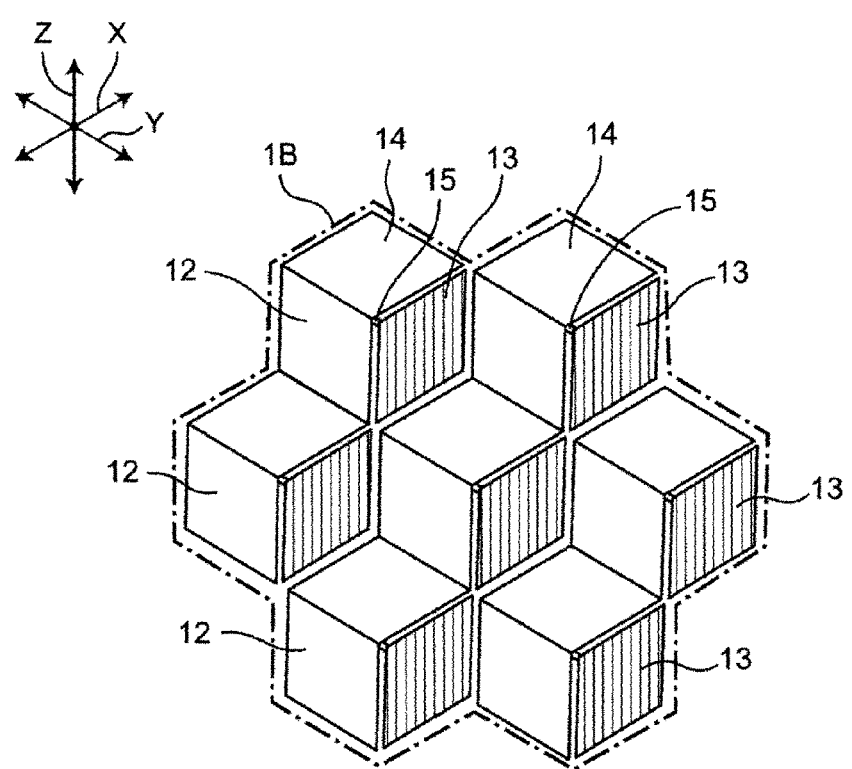
FIG. 8B is an illustration depicting another example of a vibration visualizer that includes multiple pieces of the optical member of FIG. 2 arranged densely.

Although the vibration visualizer 1 is equipped with one optical member 12 including three mirrors in the first embodiment, the present disclosure is not limited to this. As illustrated in FIG. 8A and FIG. 8B, the vibration visualizer 1 may include, for instance, multiple optical members 12 arranged densely. With this configuration, it is possible to measure the vibration of the measurement object 100 accurately from a more remote place by increasing the reflective area for light or electromagnetic wave.

It is to be noted that FIG. 8A is an illustration in which the optical members 12 are arranged to allow the movable mirror 13 of each optical member 12 to vibrate in the Z direction. A vibration visualizer 1A illustrated in FIG. 8A can have sensitivity to vibration in the Z direction. Also, FIG. 8B is an illustration in which the optical members 12 are arranged to allow the movable mirror 13 of each optical member 12 to vibrate in the Y direction. A vibration visualizer 1B illustrated in FIG. 8B can have sensitivity to vibration in the Y direction.

In the example of FIG. 8A, the end of a connection side between two fixed mirrors 14 in the Z direction, and one corner of the movable mirror 13 are connected by the spring 15 (for instance, a plate spring). In the example of FIG. 8B, the end of a connection side between two fixed mirrors 14 in the Y direction, and one corner of the movable mirror 13 are connected by the spring 15 (for instance, a plate spring). However, the present disclosure is not limited to this. The movable mirror 13 may be connected to the two fixed mirrors 14 via an elastic member. For instance, one side of either one of the two fixed mirrors 14 and one side of the movable mirror 13 may be connected via an elastic member (for instance, a plate spring, a hinge, a torsion spring).

Although a clearance is provided between the movable mirror 13 and the two fixed mirrors 14 to avoid collision therebetween in the examples of FIG. 8A and FIG. 8B, the present disclosure is not limited to this. For instance, a shock absorbing material may be provided in the movable mirror 13 or the two fixed mirrors 14 to avoid direct collision between the movable mirror 13 and the two fixed mirrors 14.

Also, color filters with mutually different colors may be respectively disposed in front (the lighting device 2 side) of the vibration visualizer (an example of the first vibration visualizer) 1A illustrated in FIG. 8A, and the vibration visualizer (an example of the second vibration visualizer) 1B illustrated in FIG. 8B. The color filters with mutually different colors are, for instance, first and second color filters with different transmission wavelength bands. The first color filter may be disposed at least on a path of light or electromagnetic wave incident on the vibration visualizer 1A, or on a path of reflected light or reflected electromagnetic wave emitted from the vibration visualizer 1A. The second color filter may be disposed at least on a path of light or electromagnetic wave incident on the vibration visualizer 1A, or on a path of reflected light or reflected electromagnetic wave emitted from the vibration visualizer 1A. For instance, a red color filter may be disposed in front of the vibration visualizer 1A, whereas a blue color filter may be disposed in front of the vibration visualizer 1B.

With this configuration, when the movable mirror 13 of the vibration visualizer 1A vibrates in the Z direction, the vibration visualizer 1A appears to be blinking in red. Attaching the vibration visualizer 1A to the measurement object 100 enables measurement of the vibration of the measurement object 100 in the Z direction. Also, with the above-mentioned configuration, when the movable mirror 13 of the vibration visualizer 1B vibrates in the Y direction, the vibration visualizer 1B appears to be blinking in blue. Attaching the vibration visualizer 1B to the measurement object 100 enables measurement of the vibration of the measurement object 100 in the Z direction. In addition, when the vibration visualizers 1A, 1B are disposed on the entire measurement object 100 in a distributed state, the vibration of the measurement object 100 in two axial directions (Y, Z directions) can be measured independently.

Also, a vibration visualizer having sensitivity to vibration in the X direction may be produced, and a color filter with a color different from red and blue (for instance, green) may be disposed in front of the vibration visualizer. When the vibration visualizer and the vibration visualizers 1A, 1B are disposed on the entire measurement object 100 in a distributed state, the vibration of the measurement object 100 in three axial directions (X, Y, Z directions) can be measured independently.

It is to be noted that in the case where the optical member 12 is affected by a factor such as wind or corrosion other than the vibration of the measurement object 100, it is not possible to accurately measure the vibration of the measurement object 100. For this reason, the optical member 12 may be sealed by providing a cover so as to cover the optical member 12. Also, antifouling surface treatment or the like may be applied to the surface of the optical member 12 or the cover.

It is to be noted that the shapes of the vibration visualizers 1A, 1B are not limited to the shapes illustrated in FIG. 8A and FIG. 8B, and may be various shapes. For instance, the shape of the vibration visualizers 1A, 1B may be a figure such as a triangle or a quadrilateral, or a shape indicating a character. In this case, when the shapes of the vibration visualizer 1A and the vibration visualizer 1B are made different from each other and disposed on the entire measurement object 100 in a distributed state, the vibration of the measurement object 100 in two axial directions can be measured independently. Additionally, a vibration visualizer having sensitivity to vibration in the X direction may be formed in a shape different from the shapes of the vibration visualizers 1A, 1B. When this additional vibration visualizer and the vibration visualizers 1A, 1B are disposed on the entire measurement object 100 in a distributed state, the vibration of the measurement object 100 in three axial directions (X, Y, Z directions) can be measured independently.

Although one of the three mirrors provided in the optical member 12 is a movable mirror 13 and two of them are fixed mirrors 14 in the first embodiment, the present disclosure is not limited to this. For instance, two of the three mirrors provided in the optical member 12 may be each a movable mirror 13 and one of them may be a fixed mirror 14. In this case, the two movable mirrors 13 may be connected to two sides of the fixed mirror 14 by an elastic member (for instance, a plate spring). Also, a clearance may be provided between the two movable mirrors 13 and the fixed mirror 14 to avoid direct collision between the two movable mirrors 13. Also, a shock absorbing material may be provided in the two movable mirrors 13 to avoid direct collision between the two movable mirrors 13. With this configuration, sensitivity to vibration in two axial directions can be achieved. However, with this configuration, it is difficult to detect a vibration direction by one image capture device 3. In this case, two or more image capture devices 3 may be installed. For instance, in order to detect light or electromagnetic wave transmitting in the reflection direction B1 is deviated in the Z direction with respect to a retroreflection direction, another image capture device 3 may be installed above the image capture device 3 illustrated in FIG. 1. With this configuration, a vibration component in the Z direction can be identified, and the component in the Y direction can be extracted by removing the Z-component from a detection signal of the image capture device 3.

Although the optical member 12 includes three mirrors in the first embodiment, the present disclosure is not limited to this. For instance, the optical member 12 may include two mirrors: one movable mirror 13 and one fixed mirror 14. In this case, although light or electromagnetic wave diagonally incident on the optical member 12 cannot be retroreflected, light or electromagnetic wave perpendicularly incident on the optical member 12 can be retroreflected.

Also, for instance, in FIG. 2, the shape of the movable mirror 13 and the fixed mirror 14 is illustrated as a rectangle. However, the present disclosure is not limited to this. For instance, the shape of the movable mirror 13 and the fixed mirror 14 may be a triangle.

It is to be noted that the movable mirror 13, the fixed mirror 14, and the spring 15 can be produced by machining such as cutting, bending, bonding, welding of, for instance, metal foil such as stainless steel (with a thickness on the order of several μm to 100 μm) with a laser. Also, for the movable mirror 13 and the fixed mirror 14, a body may be formed by plastic molding, for instance, and a specular surface may be formed by vapor-depositing aluminum or the like on the surface of the body. Also, the case 11 of the vibration visualizer 1 supporting one end of the spring 15 and the fixed mirror 14 may be produced with an accurate angle and shape by plastic molding.

In the case where the lighting device 2 is a device that irradiates with electromagnetic wave, the electromagnetic wave may have a longer wavelength than light has. Also, in this case, the size of the specular surface in a flat state of the movable mirror 13 and the fixed mirror 14 may be larger than the wavelength of the electromagnetic wave. Thus, the case where the lighting device 2 irradiates with electromagnetic wave can be handled similarly to the case where the lighting device 2 irradiates with light. It is to be noted that when electromagnetic wave with a long wavelength is used, vibration can be measured from a more remote location, for instance, a satellite.

Figure 10:
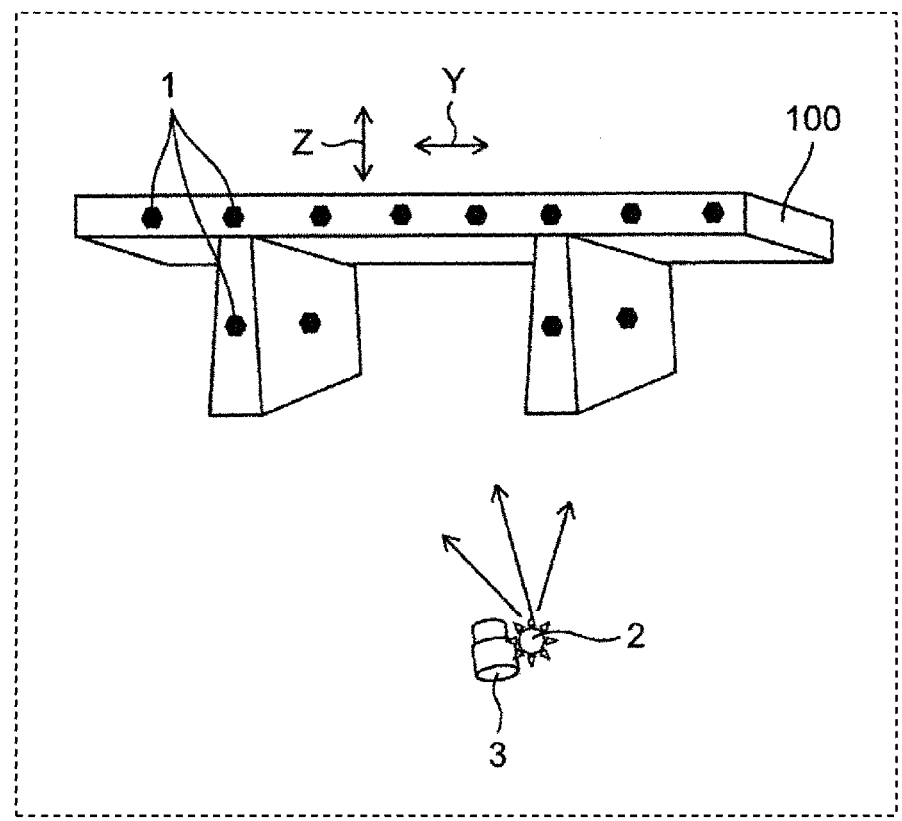
FIG. 10 is a perspective view illustrating the manner in which vibration of a bridge is measured using the vibration measurement system of FIG. 1.

Next, a vibration measurement method using the vibration measurement system according to the first embodiment will be described. FIG. 9 is a flowchart of the vibration measurement method. Here, as illustrated in FIG. 10, it is assumed that the measurement object 100 is a bridge. Hereinafter, in order to simply the description, the lighting device 2 is assumed to emit light only and description of electromagnetic wave is omitted.

First, in step S1, multiple vibration visualizers 1 are attached to the measurement object 100.

Although a portion of the measurement object 100, which is likely to deteriorate, depends on the type and structure of the measurement object 100, the vibration visualizers 1 may be installed, in a distributed state, centered on the portion which is likely to deteriorate so that a vibration mode of the entire measurement object 100 can be estimated. Since the vibration visualizer 1 according to the first embodiment does not include a component with high power consumption, the vibration visualizer 1, once attached to the measurement object 100, can be used for a long time. Thus, the vibration visualizer 1 may be fixed firmly to the measurement object 100 so as not to come off from the measurement object 100.

Next, in step S2, as illustrated in FIG. 10, the measurement object 100 is irradiated with light from the lighting device 2, and an image including reflection light reflected in a retroreflection direction by the optical member 12 of the vibration visualizer 1 is captured by the image capture device 3.

In step S2, the image captured by the image capture device 3 is such that the vibration visualizers blink according to the vibration of the measurement object 100. When the measurement object 100 is a bridge, it is known that the vibration of the bridge mainly includes components in two axial directions: the Z direction (that is, the vertical direction) and the Y direction (that is, the major axis direction of the bridge). Thus, multiple pieces of the vibration visualizer 1A illustrated in FIG. 8A and the vibration visualizer 1B illustrated in FIG. 8B are disposed on the entire bridge in a distributed state. In this manner, vibration measurement can be made in two axial directions: the Z direction and the Y direction.

Next, in step S3, the vibration measurement device 4 measures the vibration of the measurement object 100 based on the image captured by the image capture device 3. For instance, the vibration measurement device 4 performs image processing such as sampling changes in the luminance of pixels at specific positions from the image on each frame of a video captured by the image capture device 3. Thus, the vibration waveforms of the vibration visualizers 1 captured in the images can be extracted, and it is possible to measure the frequencies, phase, and amplitude of the vibration of the measurement object 100 at multiple spots.

With the vibration measurement method according to the first embodiment, the vibration visualizers 1 blink according to the vibration of the measurement object 100, and thus it is also possible to make visual observations of the vibration of the measurement object 100. In addition, the retroreflected light reflected by the vibration visualizer 1 has high directivity, and thus observation is possible even at a position several hundred meters away from the measurement object 100, for instance. Even in the case where blurring of focus or shaking occurs to some extent due to microvibration of the image capture device 3 itself, it is possible to measure the vibration of the measurement object 100 when changes in the luminance of reflected light are detectable. Therefore, it can be stated that the vibration measurement method according to the first embodiment has higher resistance to noise and environmental change compared with a conventional method.

It is to be noted that the vibration measurement device 4 desirably includes a storage unit that accumulates and stores measured vibration data of the measurement object 100, and a notification unit that notifies of abnormality by characters or voice or the like. The storage unit is, for instance, a semiconductor memory. The notification unit is, for instance, a monitor and/or a speaker. With this configuration, comparison between the past vibration data accumulated in the storage unit and the vibration data measured this time enables detection of abnormal spots and degree of abnormality of the measurement object 100. Also, the notification unit notifies the administrator of abnormality based on a result of the detection, thereby enabling early maintenance of the measurement object 100.

It is to be noted that in step S2, the light emitted from the lighting device 2 may blink periodically with a frequency near the vibrational frequency of the measurement object 100. In this case, due to image capture using a stroboscope, the differential frequency between the vibrational frequency of the measurement object 100 and the frequency of the stroboscope vibrates like undulations, and thus detailed frequency of vibration number can be identified from the undulations.

It is to be noted that the lighting device 2 and the image capture device 3 may be fixed to a position away from the measurement object 100 or installed in a mobile object such as a vehicle or a helicopter. The lighting device 2 and the image capture device 3, when being fixed to a position away from the measurement object 100, may be installed, for instance, at the side of a lighting device that illuminates a bridge for light-up or safety. In this manner, fixed point observation can be made.

Also, when the lighting device 2 and the image capture device 3 are installed in a vehicle, and vibration is excited by passing of the vehicle, it is possible to stably measure the vibration of the measurement object 100 by making the weight and velocity of the vehicle substantially constant. When an image is captured by the image capture device 3 mounted in a mobile object such as a vehicle, the position of the vibration visualizer 1 moves in the captured image. However, once the position is identified, it is easy to extract and track the characteristics by image processing.

Figure 11:
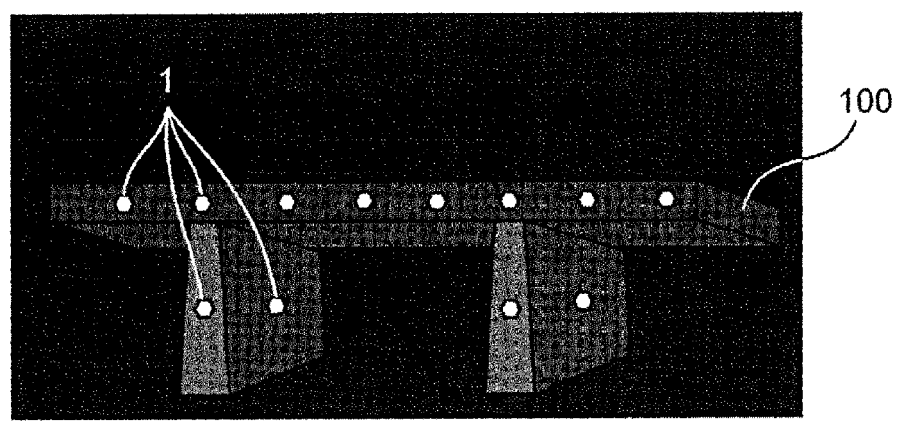
FIG. 11 is a view illustrating an image of a bridge captured at night using the vibration measurement system of FIG. 1.

It is to be noted that when an image is captured with visible light by a commonly available digital camera, it is better to capture an image in a situation where the sunlight has little effect, for instance, at night. In this case, as illustrated in FIG. 11, an image captured by the image capture device 3 includes, for instance, the measurement object 100 dimly illuminated by the lighting device 2, the vibration visualizer 1 brightly illuminated by retroreflection, and a background such as light of a streetlight or a building. It is necessary to extract the positions of the vibration visualizers 1 from the image. In this case, for instance, at the time of start of vibration measurement or during vibration measurement, the light of the lighting device 2 is blinked. In this manner, it is possible to identify the position of each vibration visualizer 1 by determining a portion that blinks in synchronization with the light of the lighting device 2. In other words, light is blinked and emitted to the vibration visualizers 1 from the lighting device 2, and an image including reflected light is captured by the image capture device. In the captured image, a portion, which blinks in synchronization with blinking of the light from the lighting device 2 and is brighter than the surroundings, is determined, thereby making it possible to identify the positions of the multiple vibration visualizers 1.

It is to be noted that as the lighting device 2, an LED may be used which emits light in a wavelength range in which the spectrum of the sunlight is weak on the ground due to absorption of water molecules, for instance, the vicinity of 1.35 μm or the vicinity of 1.15 μm. In this case, the effect of the sunlight is reduced and vibration measurement with a high S/N ratio is possible even in daytime.

Second Embodiment

Figure 12A:
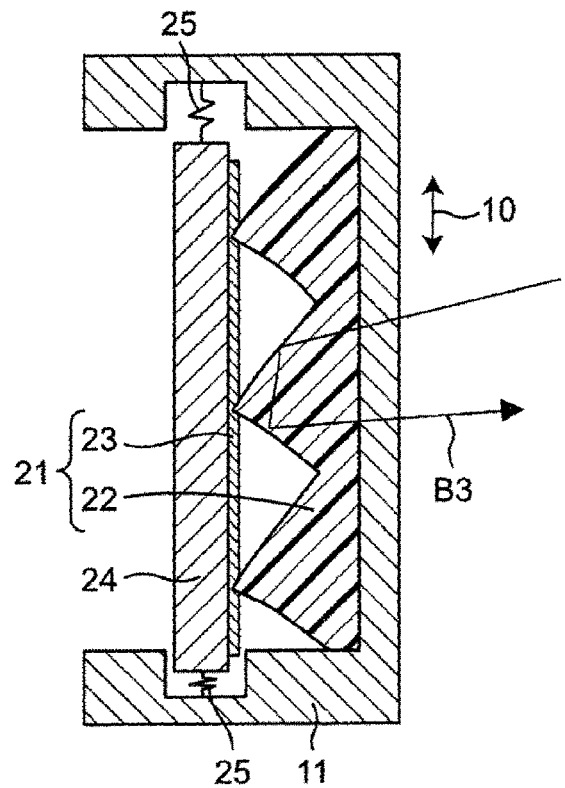
FIG. 12A is a schematic configuration diagram of a vibration visualizer included in a vibration measurement system according to a second embodiment of the present disclosure.
Figure 12B:
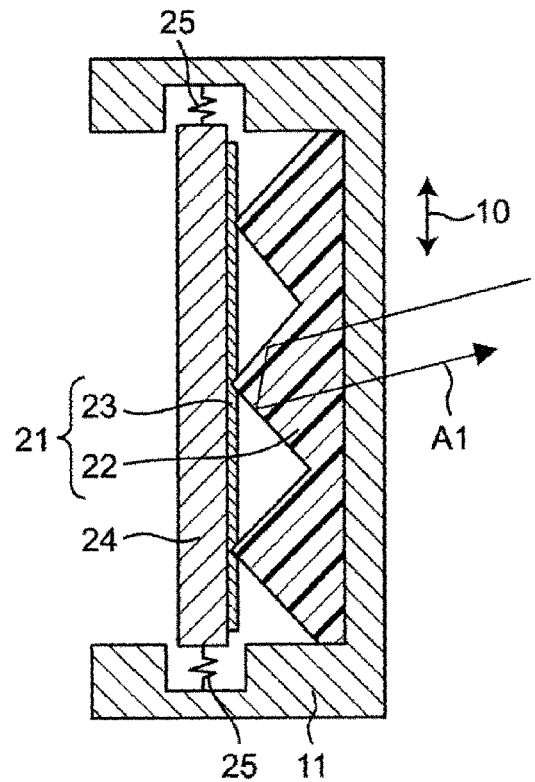
FIG. 12B is a schematic configuration diagram of the vibration visualizer included in the vibration measurement system according to the second embodiment of the present disclosure.

FIG. 12A and FIG. 12B are schematic configuration diagrams of a vibration visualizer included in a vibration measurement system according to a second embodiment of the present disclosure.

The vibration measurement system according to the second embodiment differs from the vibration measurement system according to the first embodiment in that an optical member 21 having a corner cube structure is provided instead of the optical member 12. Other components are the same as in the first embodiment.

The optical member 21 includes a corner cube 22, and a deformation member 23 that comes into contact with the top of the corner cube 22 to allow the corner cube 22 to be deformed. The deformation member 23 is an example of part of the optical member 21, and the corner cube 22 is an example of other part of the optical member 21.

The corner cube 22 is composed of a transparent and flexible resin such as silicone rubber or gel, and has three reflection faces that form a corner of a cube. The corner cube 22 can perform retroreflection with the three reflection faces concerned. Also, the corner cube 22 is attached to an inner face of the case 11 of the vibration visualizer 1.

The deformation member 23 is configured to change the flatness of at least one of the three reflection faces of the corner cube 22 according to the vibration 10. The deformation member 23 is attached to a weight 24. The weight 24 is formed in a plate shape, for instance. Both ends of the weight 24 are attached to the case 11 of the vibration visualizer 1 via a spring 25 which is an example of the elastic member. In the second embodiment, the case 11 is formed of a member that allows light or electromagnetic wave to pass through.

FIG. 12A illustrates a state where the case 11 of the vibration visualizer 1 is stationary, in other words, where the vibration 10 applied to the vibration visualizer 1 is zero. The second embodiment adopts a configuration in which the emission intensity of reflection light or reflection electromagnetic wave when the vibration 10 is zero is a value between a maximum value and a minimum value of the emission intensity. Specifically, the top of the corner cube 22 is deformed by the deformation member 23, and the flatness of at least one of the three reflection faces of the corner cube 22 is a value (for instance, the median value) between a maximum and a minimum of the flatness which is changed by the vibration 10. Thus, a reflection direction B3 of reflection light or reflection electromagnetic wave reflected by the interface between a face of the corner cube 22 and air is deviated from the retroreflection direction A1.

FIG. 12B illustrates an example of a state where the vibration 10 which has a maximum amplitude in a preset measurable range is applied to the vibration visualizer 1. At this point, deformation of the top of the corner cube 22 by the deformation member 23 is reduced, and the flatness of at least one of the three reflection faces of the corner cube 22 has a minimum value. FIG. 12B illustrates a state where at least one of the three reflection faces of the corner cube 22 is flat. In this case, the light or electromagnetic wave emitted from the lighting device 2 passes through the case 11 and enters the corner cube 22, and is totally reflected by the interface between the faces of the corner cube 22 and air. Subsequently, the light or electromagnetic wave passes through the inside of the corner cube 22 and the case 11, and transmits in the retroreflection direction A1. At this point, the emission intensity of the reflection light or reflection electromagnetic wave in the retroreflection direction A1 has a maximum value.

In contrast, when the vibration 10 which has a maximum amplitude in the preset measurable range is applied to the vibration visualizer 1, and the top of the corner cube 22 is more deformed than the top in the state of FIG. 12A by the deformation member 23, the flatness of at least one of the reflection faces of the corner cube 22 has a maximum value. Thus, the reflection direction (not illustrated) of the reflection light or reflection electromagnetic wave reflected by the reflection faces of the corner cube 22 is more deviated from the retroreflection direction A1 than the reflection direction B3. Thus, the emission intensity of the reflection light or reflection electromagnetic wave in the retroreflection direction A1 has a minimum value.

Although the reflection directions A1, B3 of reflection light or reflection electromagnetic wave are each illustrated as a line in FIG. 12A and FIG. 12B, practically, three reflection faces of the corner cube 22 have at least fine asperities, an error in arrangement. Therefore, the reflection light or reflective electromagnetic wave have diffuseness. Although the diffuseness varies with the level of asperities and an error in arrangement of the reflection faces of the corner cube 22, the diffuseness essentially exhibits an emission intensity distribution such as a normal distribution, similarly to the curves 9a to 9c which have been described using FIG. 1. Therefore, when the case 11 of the vibration visualizer 1 vibrates and the corner cube 22 of the optical member 21 vibrates accordingly, the emission intensity of the reflection light or reflection electromagnetic wave in the retroreflection direction A1 received by the image capture device 3 increases or decreases. It is possible to measure the vibration of the measurement object 100 based on the change in the emission intensity of the reflection light or reflection electromagnetic wave.

Also, in the second embodiment, multiple optical members 21 are arranged densely. The corner cubes 22 of the optical members 21 are linked so that part of the corner cubes 22 are mutually shared as illustrated in FIG. 12A and FIG. 12B. In other words, multiple optical members 21 are formed of a prism-shaped sheet. The deformation members 23 of the optical members 21 are integrated in a plate.

According to the second embodiment, since each optical member 21 has a retroreflective property, when multiple optical members 21 are irradiated with light or electromagnetic wave by one lighting device 2, reflection light or reflection electromagnetic wave reflected by the optical members 12 can be received by one image capture device 3. Specifically, the multiple vibration visualizers 1 are attached to the measurement object 100, and the multiple vibration visualizers 1 are irradiated with light or electromagnetic wave by the lighting device 2, thereby enabling the image capture device 3 to concurrently measure changes in the emission intensity of the reflection light or reflection electromagnetic wave reflected by the multiple vibration visualizers. This enables quicker detailed analysis of vibration measurement of the entire measurement object 100, and thus the vibration 10 applied to the measurement object 100 can be visualized.

Also, according to the second embodiment, each vibration visualizer 1 does not include a component that consumes power, and thus there is no necessity of replacing a battery and the number of times of maintenance can be reduced. In addition, the manufacturing cost of the vibration visualizer 1 can be reduced and deterioration such as corrosion can be lessened.

Also, according to the second embodiment, movement of the deformation member 23 relative to the corner cube 22 according to the vibration 10 allows the emission intensity of the reflection light or reflection electromagnetic wave in the retroreflection direction from the optical member 21 to be changed. In addition, the emission intensity when the vibration 10 is zero is a value between a maximum value and a minimum value of the emission intensity. With this configuration, the emission intensity of the reflection light or reflection electromagnetic wave can be increased or decreased in a wider range according to the vibration 10, and thus it is possible to measure the vibration 10 more easily.

According to the second embodiment, the optical member 21 is configured to increase or decrease the emission intensity of the reflection light or reflection electromagnetic wave according to an increase or decrease of the vibration 10 in a preset measurable range. With this configuration, the emission intensity of the reflection light or reflection electromagnetic wave can be increased or decreased in a still wider range according to the vibration 10, and thus it is possible to measure the vibration 10 still more easily.

Figure 13A:
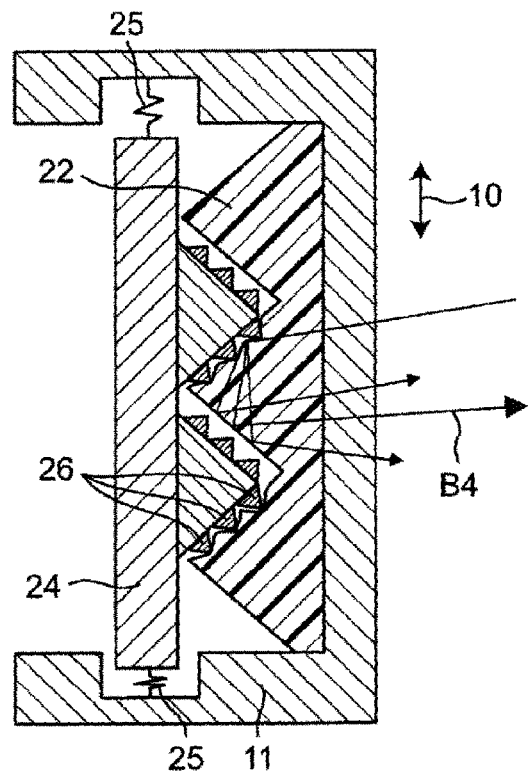
FIG. 13A is a schematic configuration diagram of a vibration visualizer according to a modification.
Figure 13B:
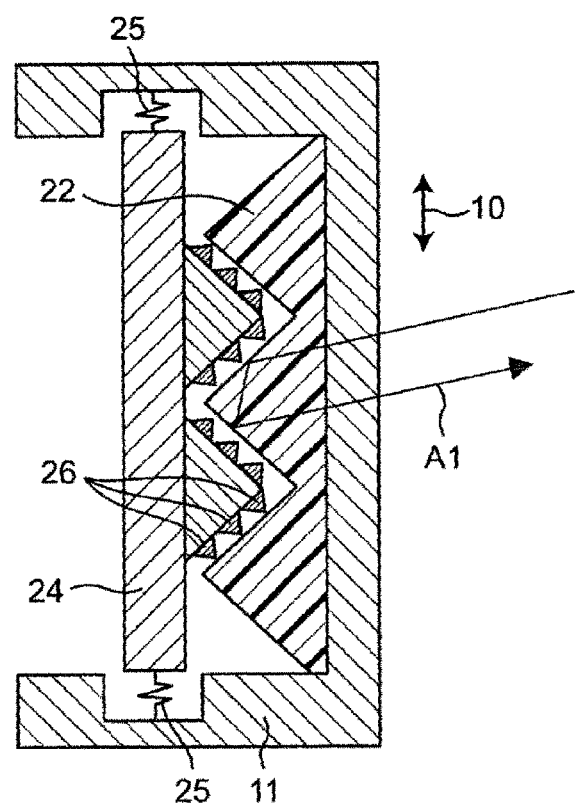
FIG. 13B is a schematic configuration diagram of the vibration visualizer according to the modification.

Although the deformation members 23 of the optical members are integrated in a plate in the second embodiment, the present disclosure is not limited to this. It is sufficient the deformation member be capable of changing the flatness of at least one of the three reflection faces of the corner cube 22 according to vibration of the vibration visualizer 1, and be capable of deviating a reflection direction B4 of reflection light or reflection electromagnetic wave from the retroreflection direction A1. For instance, as illustrated in FIG. 13A and FIG. 13B, the deformation member may be a projection 26 that projects from the surface of the weight 24 toward the corner cube 22. The projection 26 comes into contact with part of the corner cube 22 according to vibration of the vibration visualizer 1 to change the flatness of at least one of the three reflection faces of the corner cube 22, and thus the same effects as in the second embodiment are obtainable.

Third Embodiment

Figure 14A:
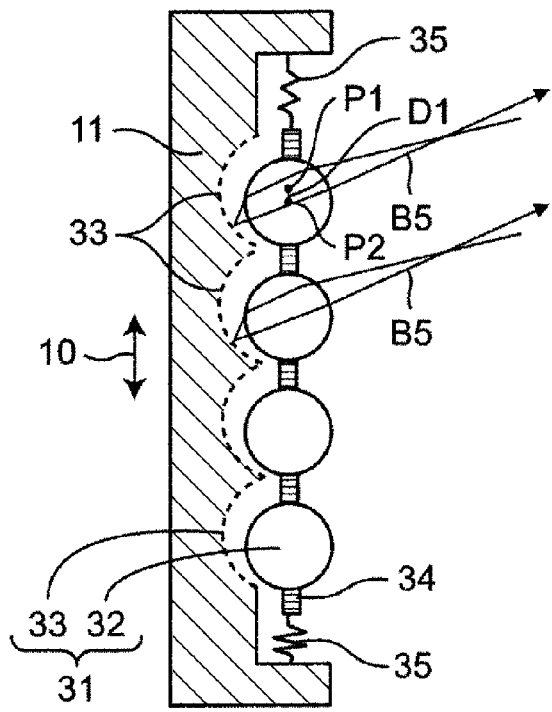
FIG. 14A is a schematic configuration diagram of a vibration visualizer included in a vibration measurement system according to a third embodiment of the present disclosure.
Figure 14B:
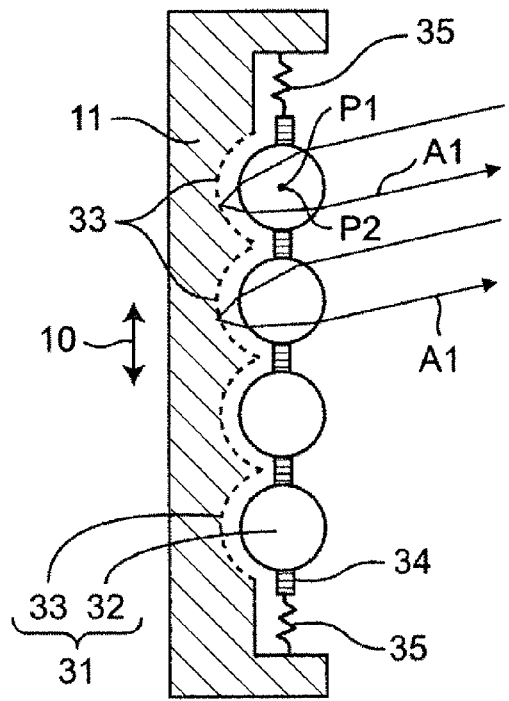
FIG. 14B is a schematic configuration diagram of the vibration visualizer included in the vibration measurement system according to the third embodiment of the present disclosure.

FIG. 14A and FIG. 14B are schematic configuration diagrams of a vibration visualizer included in a vibration measurement system according to a third embodiment of the present disclosure.

The vibration measurement system according to the third embodiment differs from the vibration measurement system according to the first embodiment in that instead of the optical member 12, an optical member 31 having a beads-like shape is provided. Other components are the same as in the first embodiment.

The optical member 31 includes a spherical lens 32, and a concave reflective surface material 33 that is disposed behind (the side away from the lighting device 2) the spherical lens 32 and movable independently to the spherical lens 32. In the state of FIG. 14B, the concave reflective surface material 33 has a concave surface concentrically with the spherical lens 32. In other words, the concave reflective surface material 33 has a partially spherical shape. The spherical lens 32 is an example of part of the optical member 31, and the concave reflective material 33 is an example of other part of the optical member 31. In the third embodiment, a distance D1 between the center of curvature P1 of the spherical lens 32 and the center of curvature P2 of the concave reflective surface material changes according to the vibration 10.

FIG. 14A illustrates a state where the case 11 of the vibration visualizer 1 is stationary, in other words, the vibration 10 applied to the vibration visualizer 1 is zero. The third embodiment adopts a configuration in which the emission intensity of reflection light or reflection electromagnetic wave when the vibration 10 is zero is a value between a maximum value and a minimum value of the emission intensity. Specifically, when the vibration 10 is zero, the spherical lens 32 and the concave reflective surface material 33 are arranged so that the distance between them is a value (for instance, the median value) between a maximum and a minimum of the distance D1 which is changed by the vibration 10. Thus, a reflection direction B5 of reflection light or reflection electromagnetic wave reflected by the concave reflective surface material 33 is deviated from the retroreflection direction A1.

FIG. 14B illustrates an example of a state where the vibration 10 which has a maximum amplitude in a preset measurable range is applied to the vibration visualizer 1. When the vibration 10 is at a maximum in a preset measurable range, the distance D1 between the center of curvature P1 of the spherical lens 32 and the center of curvature P2 of the concave reflective surface material 33 has a maximum. When the vibration 10 is at a maximum in the opposite direction to a predetermined direction in a preset measurable range, the distance D1 has a minimum (for instance, zero). FIG. 14B illustrates a state where the distance D1 is zero. In this case, the light or electromagnetic wave emitted from the lighting device 2 passes through the spherical lens 32 and is concentrated on the concave reflective surface material 33. Subsequently, the light or electromagnetic wave is reflected by the concave reflective surface material 33 and is incident on the spherical lens 32 again, passes along a path symmetrical with respect to the center of the spherical lens 32, and transmits in the retroreflection direction A1. At this point, the emission intensity of the reflection light or reflection electromagnetic wave in the retroreflection direction A1 has a maximum value.

Meanwhile, when the distance D1 has a maximum (for instance, the distance twice as much as the distance D1 illustrated in FIG. 14A), the reflection direction (not illustrated) of the reflection light or reflection electromagnetic wave reflected by the concave reflective surface material 33 is more deviated from the retroreflection direction A1 than the reflection direction B5. Thus, the emission intensity of the reflection light or reflection electromagnetic wave in the retroreflection direction A1 has a minimum value.

Although the reflection directions A1, B5 of reflection light or reflection electromagnetic wave are each illustrated as a line in FIG. 14A and FIG. 14B, practically, the spherical lens 32 or the concave reflective surface material have at least fine asperities, an error in arrangement. Therefore, the reflection light or reflective electromagnetic wave have diffuseness. Although the diffuseness varies with the level of asperities and an error in arrangement of the spherical lens, the diffuseness essentially exhibits an emission intensity distribution such as a normal distribution, similarly to the curves 9a to 9c which have been described using FIG. 1. Therefore, when the case 11 of the vibration visualizer 1 vibrates and the concave reflective surface material 33 of the optical member 31 vibrates accordingly, the emission intensity of the reflection light or reflection electromagnetic wave in the retroreflection direction A1 received by the image capture device 3 increases or decreases. It is possible to measure the vibration of the measurement object 100 based on the change in the emission intensity of the reflection light or reflection electromagnetic wave.

Also, in the third embodiment, in the optical members 31, multiple spherical lenses 32 are arranged densely. The spherical lens 32 of each optical member 31 is supported by a support member 34 as illustrated in FIG. 14A and FIG. 14B. The support member 34 is, for instance, a plate-like member having multiple holes to receive the spherical lens 32, and is attached to the case 11 of the vibration visualizer 1 via the spring 35 which is an example of the elastic member. The support member 34 is composed of, for instance, resin, metal, or a combination thereof.

According to the third embodiment, the optical member 31 has a retroreflective property. Therefore, irradiation of multiple optical members 31 with light or electromagnetic wave by a single lighting device 2 allows a single image capture device 3 to receive reflection light or reflection electromagnetic wave reflected by the multiple optical members 31. In other words, multiple vibration visualizers 1 are attached to the measurement object 100, and the vibration visualizers 1 are irradiated with light or electromagnetic wave from the lighting device 2, thereby making it possible to simultaneously measure the change in the emission intensity of the reflection light or reflection electromagnetic wave reflected by the vibration visualizers 1. This enables quicker detailed analysis of vibration measurement of the entire measurement object 100, and thus the vibration 10 applied to the measurement object 100 can be visualized.

Also, according to the third embodiment, each vibration visualizer 1 does not include a component that consumes power, and thus there is no necessity of replacing a battery and the number of times of maintenance can be reduced. In addition, the manufacturing cost of the vibration visualizer 1 can be reduced and deterioration such as corrosion can be lessened.

According to the third embodiment, movement of the spherical lens 32 relative to the concave reflective surface material 33 according to the vibration 10 allows the emission intensity of the reflection light or reflection electromagnetic wave in the retroreflection direction A1 from the optical member 31 to be changed. Also, the emission intensity of reflection light or reflection electromagnetic wave when the vibration 10 is zero is a value between a maximum value and a minimum value of the emission intensity. Specifically, when the vibration 10 is zero, the center of curvature P1 of the spherical lens 32 and the center of curvature P2 of the concave reflective surface material 33 are deviated from each other. With this configuration, the emission intensity of the reflection light or reflection electromagnetic wave can be increased or decreased in a wider range according to the vibration 10, and thus it is possible to measure the vibration 10 more easily.

According to the third embodiment, the optical member 31 is configured to increase or decrease the emission intensity of the reflection light or reflection electromagnetic wave according to the vibration 10 in a preset measurable range. With this configuration, the emission intensity of the reflection light or reflection electromagnetic wave can be increased or decreased in a still wider range according to the vibration 10, and thus it is possible to measure the vibration 10 still more easily.

EXAMPLE

A vibration visualizer according to the Example has the same configuration as the configuration of the vibration visualizer 1 according to the first embodiment. That is, the vibration visualizer according to the Example includes the movable mirror 13, the fixed mirror 14, and the spring 15. In the vibration visualizer according to the Example, the movable mirror 13, the fixed mirror 14, and the spring 15 are resin-molded using a 3D printer. The movable mirror 13 and the fixed mirror 14 are configured include a thin glass mirror on which aluminum is vapor-deposited. The spring 15 is configured such that the natural frequency of the movable mirror 13 is 56 Hz.

In addition, the back surface of the fixed mirror 14 is provided with an adjustment mechanism that can make fine adjustment of the angle formed by the movable mirror 13 and the fixed mirror 14. The adjustment mechanism adjusts the angle formed by the movable mirror 13 and the fixed mirror 14 with no vibration applied to the median angle between an angle for which the luminance of the image capture device 3 has a maximum value and an angle for which the luminance of the image capture device 3 is substantially zero.

Thus configured vibration visualizer according to the Example is attached to a vibrating device, and 3.0 Hz sine wave is inputted to the vibrating device from a signal generator to generate vibration. A vibration in the same conditions as for the aforementioned vibration was measured by a commercially available MEMS accelerometer, and it has been verified that sine wave vibration with a peak acceleration value of ±0.010 m/s$^2$ is generated by the vibrating device.

In the Example, a commercially available digital camera was used for the image capture device 3. A white LED video light was used for the lighting device 2, and was mounted on a mounting part of the top of the image capture device 3. Subsequently, dynamic images of the vibration visualizer according to the Example were captured by the image capture device 3 with 120 frames/sec while the vibration visualizer was being irradiated with LED light from the lighting device 2.

The captured dynamic images show the manner in which the vibration visualizer according to the Example was repeating light and dark with 3 Hz. Data for a pixel area in the vibration visualizer according to the Example is extracted for each frame in the images, and the luminance of RGB in the pixel area was integrated and a luminance value of the vibration visualizer was obtained. FIG. 15 is a graph illustrating a change in thus obtained luminance value.

Figure 16:
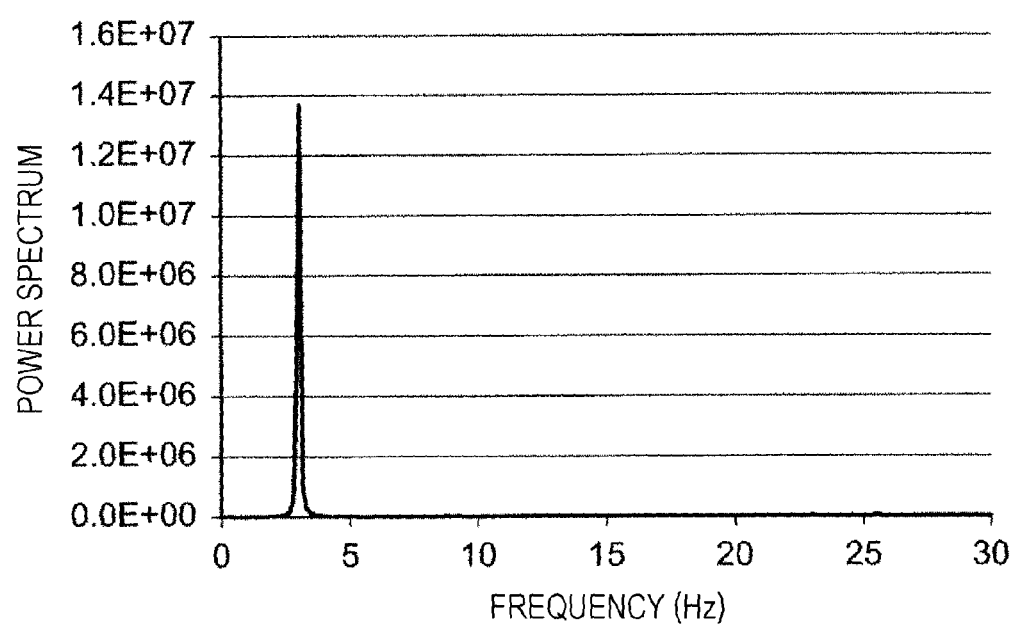
FIG. 16 is a graph illustrating a result of calculation of power spectrum of a waveform indicating the change in luminance value of FIG. 15.

As illustrated in FIG. 15, although a waveform 120, which indicates a change in the luminance value, has slight noise, the waveform 120 exhibits 3 Hz sine wave. The size of the noise was smaller than that of the commercially available MEMS accelerometer. Also, the power spectrum of the waveform 120 of FIG. 15 was calculated by Fast Fourier Transform (FFT), and it has been verified that the power spectrum has a single peak exactly at 3.0 Hz as illustrated in FIG. 16. Thus, it has been verified that the waveform of vibration is measurable. When the amplitude, frequency of vibration was changed by changing an input signal to the vibrating device, the luminance value was also changed accordingly, and a waveform of vibration corresponding to the vibration intensity of the vibrating device was measurable in a frequency range up to approximately 40 Hz.

When the angle formed by the movable mirror 13 and the fixed mirror 14 in a stationary state was made closer to a right angle, distortion occurred at an upper end of the waveform. Also, when the angle formed by the movable mirror 13 and the fixed mirror 14 in a stationary state was set to a right angle, the waveform of the luminance value exhibited a waveform corresponding to the absolute value of a sine wave. Therefore, it has been found that in order to reproduce the waveform of vibration (acceleration in this embodiment) from luminance values, the angle formed by the movable mirror 13 and the fixed mirror 14 in a stationary state may be set so that the emission intensity to the image capture device 3 is a value between a maximum value and a minimum value of the emission intensity as in the vibration visualizer of the present disclosure.

In this manner, it has been verified that vibration measurement can be made from a remote place by attaching the vibration visualizer according to the present disclosure to a measurement object.

It is to be noted that any embodiments out of the various embodiments described above may be combined as appropriate, thereby providing the respective effects of the embodiments.

In the present disclosure, several embodiments have been sufficiently described with reference to the accompanying drawings, and various modifications and alterations will be apparent to those skilled in the art. It should be understood that such modifications and alterations are within the scope of the appended claims as long as the modifications and alterations do not depart from the scope of the present disclosure.

The present disclosure makes it possible to measure the vibration of the entire measurement object in a shorter time and to reduce the number of times of maintenance. Thus, the present disclosure is useful for not only a public structure such as a bridge or a tunnel, but also for evaluation, monitoring of soundness of a machine, a building or the like. In addition, when the size of the vibration visualizer is increased, it is possible to measure the vibration of the entire measurement object from an airplane or a satellite, and the present disclosure is also applicable to measurement, monitoring of an earthquake.

What is claimed is:

1. A vibration visualizer comprising
an optical member including
a fixed section to be fixed to a measurement object; and
a movable section movably supported by the fixed section such that a first positional relationship between the fixed section and the movable section is changed by application of an acceleration to the fixed section in a predetermined direction, wherein
the optical member changes a reflection intensity of light or electromagnetic wave reflected in a retroreflection direction according to a change of the first positional relationship,
the first positional relationship in a stationary state where the acceleration is not applied to the fixed section and the first positional relationship is maintained constant, is different from the first positional relationship most suitable for retroreflection, and
the optical member includes a first mirror having a first specular surface, a second mirror having a second specular surface, and a third mirror having a third specular surface, and
any two of the first specular surface, second specular surface and third specular surface are not parallel to each other in the stationary state.

2. The vibration visualizer according to claim 1, wherein the optical member is configured such that the reflection intensity of light or electromagnetic wave reflected in the retroreflection direction changes monotonously according to the change of the first positional relationship.

3. The vibration visualizer according to claim 1, wherein:
the first mirror is included in the fixed section,
the second mirror is included in the movable section and supported by the fixed section such that a second positional relationship between first mirror and the second mirror is changed by the application of the acceleration to the fixed section in the predetermined direction, and
in the stationary state, an angle between the first specular surface and the second specular surface is different from a right angle.

4. The vibration visualizer according to claim 3, wherein the second mirror is connected to the fixed section via an elastic member.

5. The vibration visualizer according to claim 3, wherein the optical member is configured such that the reflection intensity of the light or electromagnetic wave reflected in the retroreflection direction changes monotonously according to a change of the angle.

6. The vibration visualizer according to claim 3, wherein
in the stationary state, the angle is greater than 90 degrees, and
in a dynamic state where the acceleration is applied to the fixed section and the second positional relationship is changed, the angle is equal to or greater than 90 degrees.

7. The vibration visualizer according to claim 3, wherein
in the stationary state, the angle is less than 90 degrees, and
in a dynamic state where the acceleration is applied to the fixed section and the second positional relationship is changed, the angle is equal to or less than 90 degrees.

8. A vibration visualizer comprising
an optical member including a fixed section to be fixed to a measurement object; and
a movable section movably supported by the fixed section such that a first positional relationship between the fixed section and the movable section is changed by application of an acceleration to the fixed section in a predetermined direction, wherein
the optical member changes a reflection intensity of light or electromagnetic wave reflected in a retroreflection direction according to a change of the first positional relationship,
the first positional relationship in a stationary state where the acceleration is not applied to the fixed section and the first positional relationship is maintained constant, is different from the first positional relationship most suitable for retroreflection,
the optical member includes a corner cube having three reflection faces perpendicular to each other, and a deformation member contacting with the corner cube,
at least a part of the corner cube is included in the fixed section,
the deformation member is included in the movable section and supported by the fixed section such that at least one of the three reflection faces is deformed by the deformation member by the application of the acceleration to the fixed section in the predetermined direction, and
in the stationary state, the at least one of the three reflection faces of the corner cube is deformed by the deformation member.

9. The vibration visualizer according to claim 8, wherein the optical member is configured such that the reflection intensity of the light or electromagnetic wave reflected in the retroreflection direction changes monotonously according to a deformation quantity of the at least one of the three reflection faces of the corner cube.

10. A vibration visualizer comprising
an optical member including
a fixed section to be fixed to a measurement object; and
a movable section movably supported by the fixed section such that a first positional relationship between the fixed section and the movable section is changed by application of an acceleration to the fixed section in a predetermined direction, wherein
the optical member changes a reflection intensity of light or electromagnetic wave reflected in a retroreflection direction according to a change of the first positional relationship,
the first positional relationship in a stationary state where the acceleration is not applied to the fixed section and the first positional relationship is maintained constant, is different from the first positional relationship most suitable for retroreflection,
the optical member includes a spherical lens and a reflective member having a concave reflective surface, the reflective member being located behind the spherical lens,
one of the spherical lens and the reflective member is included in the fixed section,
the other of the spherical lens and the reflective member is included in the movable section and supported by the fixed section such that a second positional relationship between the one and the other is changed by the application of the acceleration to the fixed section in the predetermined direction, and
in the stationary state, a curvature center of the spherical lens and a curvature center of the concave reflective surface is displaced from each other.

11. The vibration visualizer according to claim 10, wherein
the spherical lens is one of a plurality of spherical lenses connected to each other,
the reflective member has a plurality of concave reflective surfaces respectively located behind the plurality of spherical lenses,
the reflective member is included in the fixed section, and
the spherical lenses are included in the movable section and connected to the fixed section via an elastic member.

12. The vibration visualizer according to claim 10, wherein the optical member is configured such that the reflection intensity of the light or electromagnetic wave reflected in the retroreflection direction changes monotonously according to a change in a distance between the curvature center of the spherical lens and the curvature center of the concave reflective surface.

13. A vibration measurement system comprising:
a first vibration visualizer, and a second vibration visualizer, each of which comprises:
an optical member including
a fixed section to be fixed to a measurement object; and
a movable section movably supported by the fixed section such that a first positional relationship between the fixed section and the movable section is changed by application of an acceleration to the fixed section in a predetermined direction,
wherein the optical member changes a reflection intensity of light or electromagnetic wave reflected in a retroreflection direction according to a change of the first positional relationship, and
the first positional relationship in a stationary state where the acceleration is not applied to the fixed section and the first positional relationship is maintained constant, is different from the first positional relationship most suitable for retroreflection;
a lighting device that emits light or electromagnetic wave to the first vibration visualizer and the second vibration visualizer which are fixed to the measurement object;
an imaging device that captures an image depicting the measurement object, the first vibration visualizer and the second vibration visualizer; and
a vibration measurement device that measures the change of the first positional relationship between the fixed section and the movable section in each of the first vibration visualizer and the second vibration visualizer, based on a change of a luminance of reflected light or a change of an amount of reflected electromagnetic wave from each of the first vibration visualizer and the second vibration visualizer in the image captured by the imaging device.

14. The vibration measurement system according to claim 13, wherein the lighting device has an irradiation angle which allows the first vibration visualizer and the second vibration visualizer to be irradiated.

15. The vibration measurement system according to claim 13, wherein the vibration measurement device includes:
an image processor that extracts the change in the luminance of the reflected light or the change in the amount of the reflected electromagnetic wave; and
a converter that converts the change of the luminance of the reflected light or the change of the amount of the reflected electromagnetic wave extracted by the image processor to a signal corresponding to the change of the first positional relationship.

16. A method of measuring vibration of the measurement object using the vibration visualizer according to claim 1, the method comprising:
- emitting light or electromagnetic wave to the vibration visualizer fixed to the measurement object;
- capturing an image depicting the measurement object and the vibration visualizer; and
- measuring the change of the first positional relationship between the fixed section and the movable section in the vibration visualizer, based on a change of a luminance of reflected light or a change of an amount of reflected electromagnetic wave from the vibration visualizer in the image.

* * * * *